G. CLAUDE.
PRODUCTION OF HYDROGEN.
APPLICATION FILED MAY 31, 1918.
1,426,462.
Patented Aug. 22, 1922.
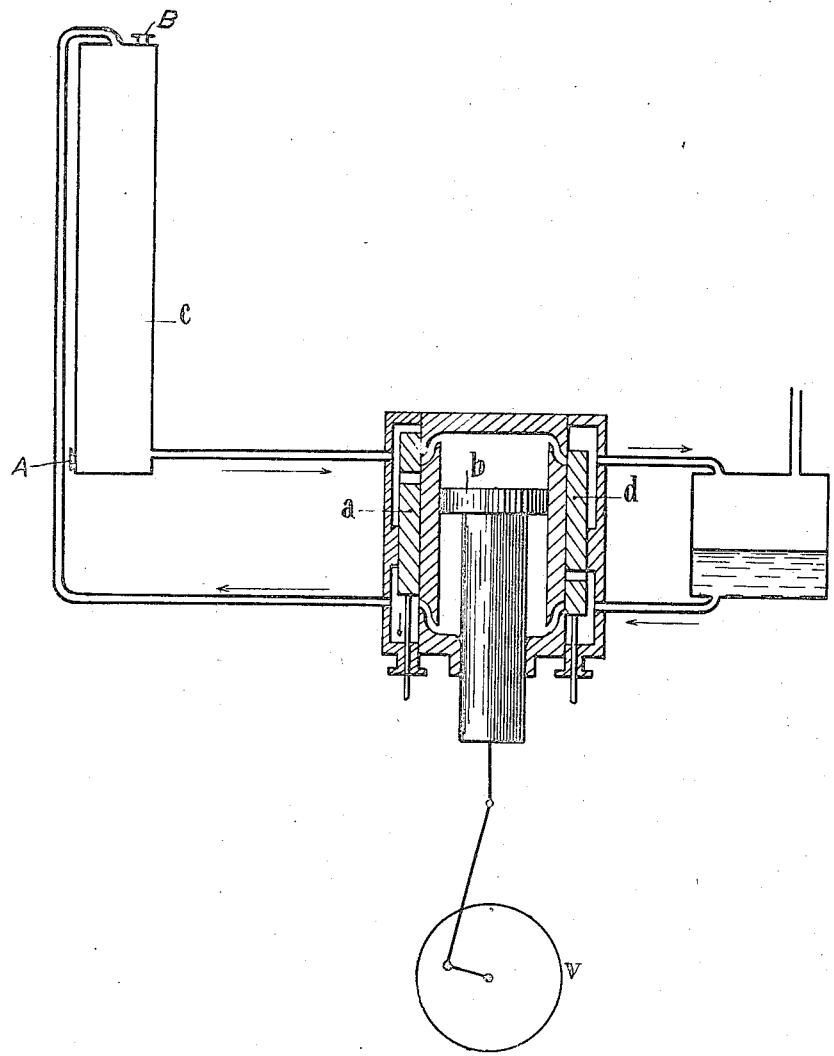

UNITED STATES PATENT OFFICE.

GEORGES CLAUDE, OF BOULOGNE-SUR-SEINE, FRANCE, ASSIGNOR TO L'AIR LIQUIDE SOCIETE ANONYME POUR L'ETUDE ET L'EXPLOITATION DES PROCEDES GEORGES CLAUDE, OF PARIS, FRANCE.

PRODUCTION OF HYDROGEN.

1,426,462.     Specification of Letters Patent.     Patented Aug. 22, 1922.

Application filed May 31, 1918. Serial No. 237,542.

*To all whom it may concern:*

Be it known that I, GEORGES CLAUDE, a citizen of the Republic of France, residing at 14 Boulevard d'Auteuil, Boulogne-sur-Seine, in the Republic of France, have invented certain new and useful Improvements in the Production of Hydrogen, of which the following is a specification.

I have described heretofore in a co-pending application, Ser. No. 222,505, filed March 14, 1918, a method of recovering hydrogen from gaseous mixtures by subjecting such a mixture under pressure to solution in a suitable liquid, while the liquid is maintained at a low temperature. By the practice of this method, the constituents other than hydrogen are dissolved in the liquid and the hydrogen in a substantially pure condition is withdrawn from the apparatus employed, while the dissolved gases are subsequently released from the liquid which is returned to the cycle. I have shown in that prior application that by operating at a low temperature I reduce the loss of solvent liquid resulting from its vapor tension, and that I improve the ratio of the coefficient of solubility of the principal constituent accompanying the hydrogen, namely carbon monoxide to the coefficient of solubility of the hydrogen. While various liquids may be employed, I have specifically mentioned ethyl ether as admirably adapted to the accomplishment of the desired result.

I have also indicated that the power necessarily expended in introducing the solvent under pressure into the solution chamber may be provided in part, at least, by discharging the solvent through an engine. On the other hand, it has already been proposed to let the gases contained under pressure in the solvent after dissolution be expanded with production of work, thereby producing some cold which may be utilized for obtaining and maintaining the desired low temperature.

The present invention has for its object the more efficient utilization of the power developed by that expansion to return the solvent under pressure to the solution chamber and involves a method whereby this result is accomplished without the interposition of any means which would absorb and waste power, and consequently under the most efficient conditions. To this end, I utilize a differential piston working in a cylinder, the larger face of the piston acting as an expander, while the smaller face acts as a pump.

The mode of applying my invention will be more apparent by reference to the following specification when read in connection with the accompanying drawing, in which I have diagrammatically illustrated an apparatus adapted to its accomplishment, it being understood that the drawing is illustrated merely, and that various modifications of the apparatus as to detail and construction may be readily made.

Referring to the drawing, C indicates a tower or solution chamber in which the solution of the gas under pressure is effected. The gaseous mixture is introduced by a compressor (not shown) through an inlet A and travels upwardly in contact with the liquid solvent, for example, ethyl ether descending through the chamber. The unsaturated residual gas which is substantially pure hydrogen escapes from the upper part of the tower through a pipe B. The liquid saturated with the dissolved gas finally reaches the bottom of the tower and escapes in amounts regulated by a slide valve *a*, into the cylinder above the larger face of the differential piston *b*.

Assuming that a sufficient quantity of saturated liquid under pressure has been admitted into the cylinder above the piston *b* in its downward stroke, the valve *a* is closed under the actuation of a cam (not shown), which is fast to the shaft of the expander. Expansion follows during the remainder of the downward piston stroke on account of the disengagement of the gases from the liquid. These disengagements and expansions produce cold which is transmitted directly to the cylinder walls and to the liquid. During this expanding stroke of the piston, the smaller face thereof forces an equal quantity of unsaturated liquid from the cylinder and introduces it under pressure into the tower C. The excess of power developed by the expansion of the dissolved gas, if any, is utilized outside the apparatus, for example, by means of the fly-wheel V.

During the expanding stroke of the piston, the second slide valve *d*, which is actuated by a cam (not shown) fixed to the shaft, remains closed. During the return stroke of the piston, the valve $a$ remains motionless and closed while the valve $d$ is actuated to permit communication between the cylinder above the larger face of the piston and the upper part of the liquid reservoir. At the same time, communication is established between the cylinder below the smaller face of the piston and the lower part of the reservoir. In this manner, the cold gas and the liquid are forced by the piston from the upper part of the cylinder and delivered to the reservoir, where the gas separates from the liquid. Meanwhile, a portion of the cold unsaturated liquid equal to that which is delivered from the cylinder to the reservoir returns from the reservoir into the cylinder beneath the smaller face of the piston. Finally, during the upward stroke of the piston, the valve $d$ closes and the operation continues as before.

It is to be understood that the entire apparatus including connecting pipes is well insulated to prevent dissipation of the cold developed by leakage of external heat through the walls and that the cold contained in the separated gases may be recovered for instance, for cooling the compressed gas to be separated.

I claim:

1. In the separation of the constituents of gaseous mixtures and particularly in the recovery of hydrogen by solution under pressure and at low temperature of the other constituents of the mixture, the method which comprises, disengaging and expanding the gas which is dissolved in a limited quantity of saturated liquid and thereby cooling the liquid, separating the gas from the liquid and directly utilizing the power produced by said expansion for returning an equal quantity of the unsaturated liquid for further absorption of gas under pressure.

2. In the separation of the constituents of gaseous mixtures and particularly in the recovery of hydrogen by solution under pressure and at low temperature of the other constituents of the mixture, the method which comprises, disengaging and expanding the gas which is dissolved in a limited quantity of saturated liquid and thereby cooling the liquid, separating the gas from the liquid, discharging the gas and liquid to a reservoir, while a corresponding quantity of cold, unsaturated liquid is withdrawn therefrom, and directly utilizing the power produced by the expansion to return the unsaturated liquid under pressure for further absorption of gas.

3. In an apparatus for separating the constituents of gaseous mixtures, and particularly in the recovery of hydrogen by solution under pressure and at low temperature of the other constituents of the mixture, the combination of a solution chamber, means for delivering the gaseous mixture to and for withdrawing the residual gas from said chamber, and means for circulating a liquid solvent including a cylinder, a differential piston therein, a reservoir, and valve controlled connections between both ends of said cylinder and said chamber and reservoir respectively, whereby a limited quantity of liquid from said chamber is admitted to said cylinder in contact with the larger face of said piston, and the gas dissolved in said liquid is permitted to expand and thereby force an equal quantity of cold unsaturated liquid from said cylinder at the other side of said piston into said solution chamber.

GEORGES CLAUDE.